June 16, 1936.         O. F. CARLSON         2,044,465
PRESSURE AND DIFFERENTIAL CONTROL
Filed Dec. 17, 1932      3 Sheets—Sheet 1
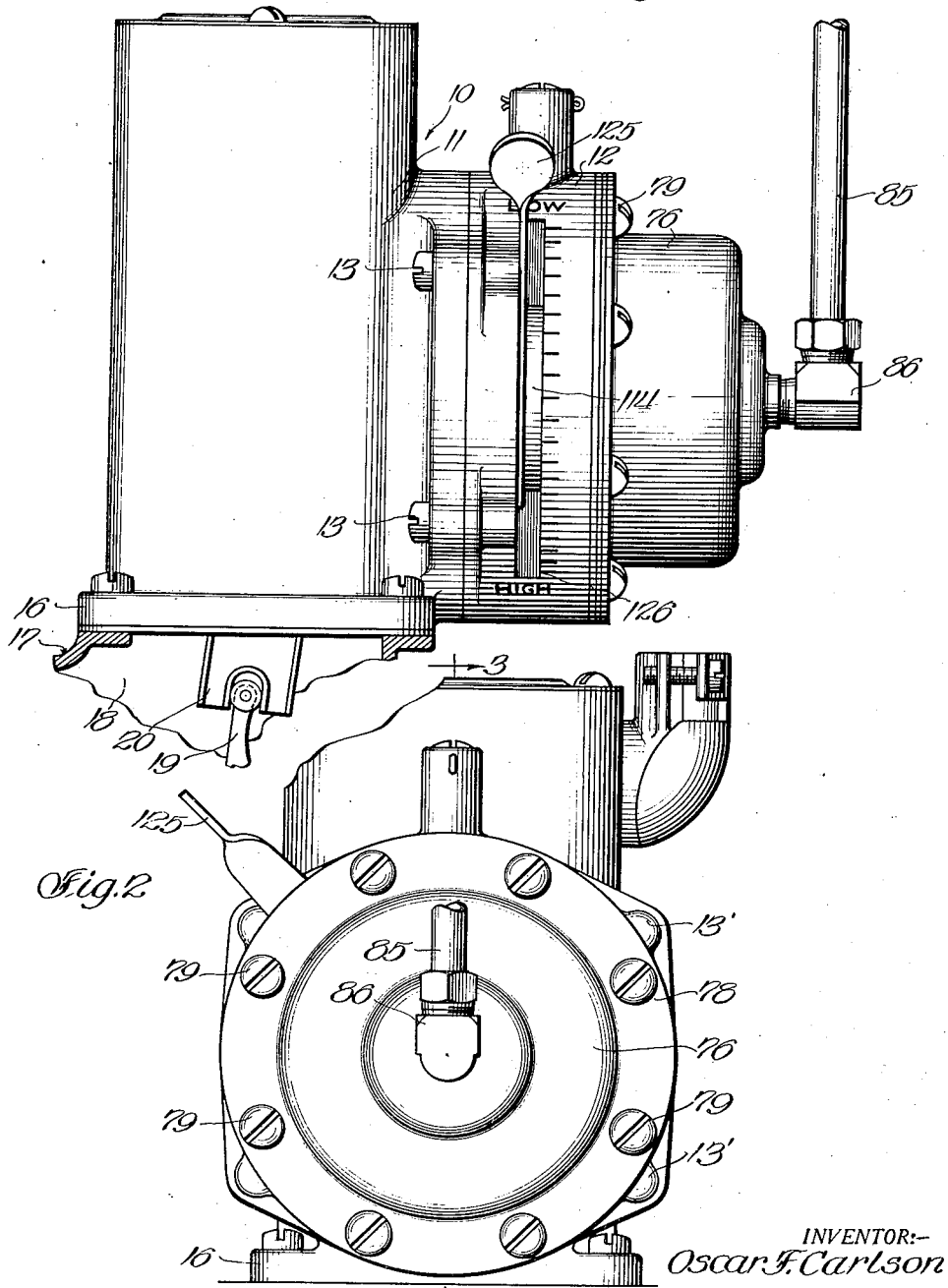
INVENTOR:—
Oscar F. Carlson
BY
Brown, Jackson, Boettcher + Dienner
ATTORNEYS

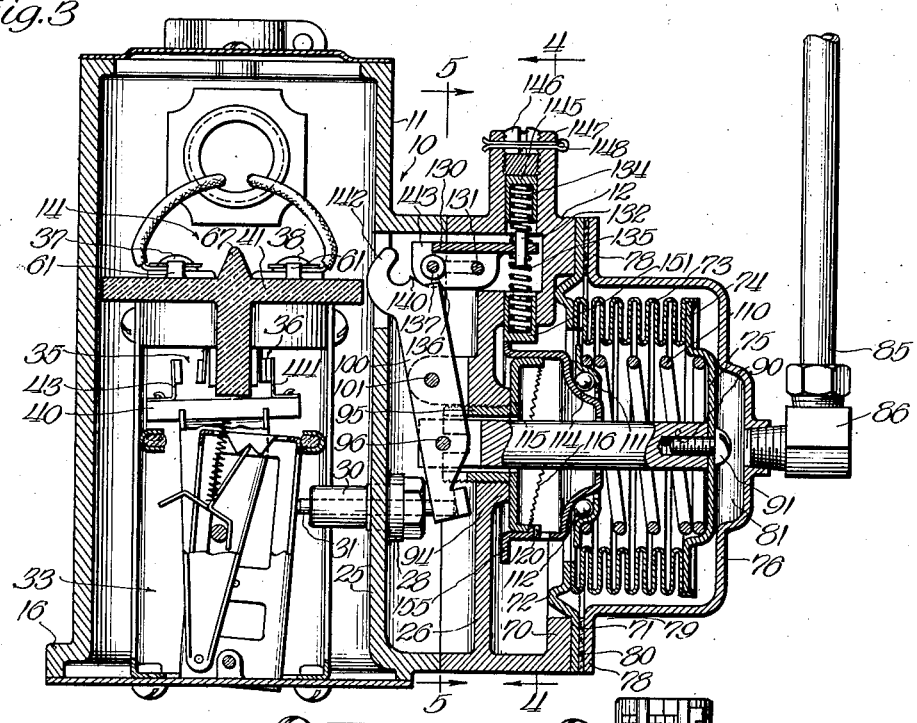
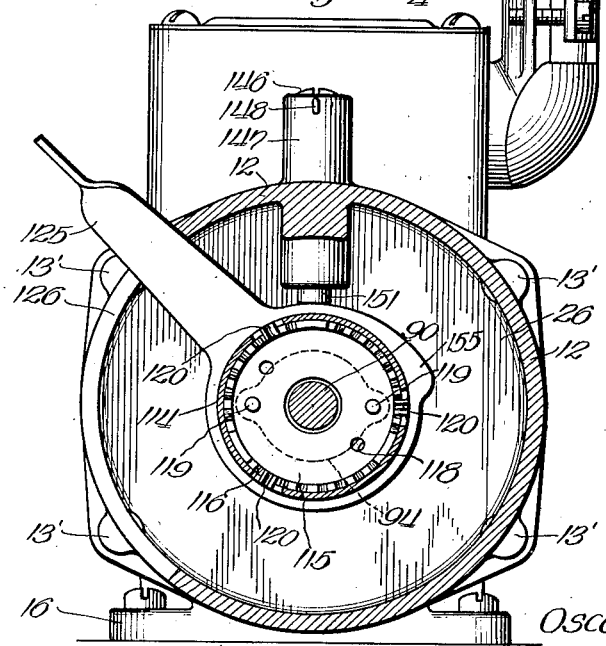

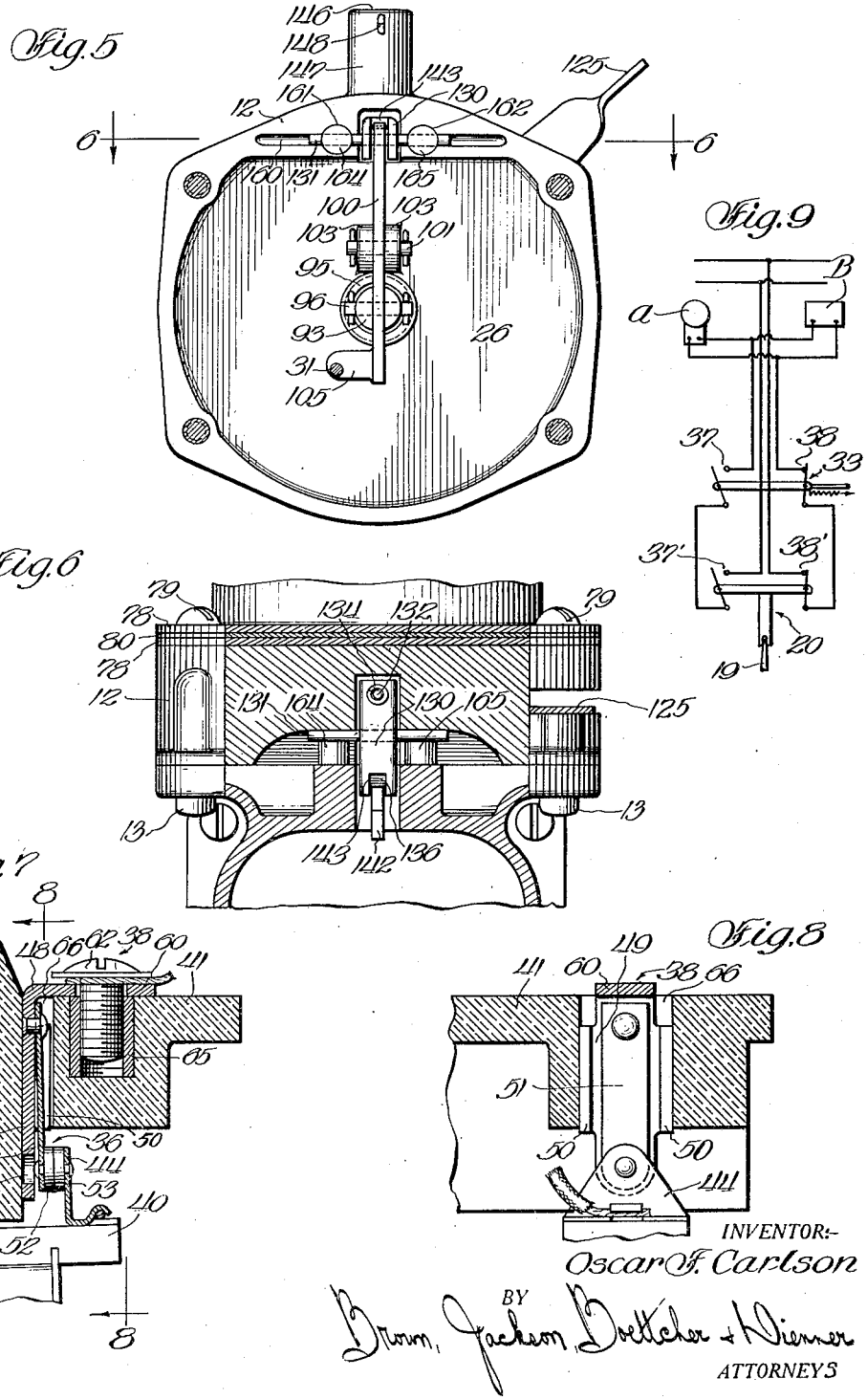
June 16, 1936.  O. F. CARLSON  2,044,465
PRESSURE AND DIFFERENTIAL CONTROL
Filed Dec. 17, 1932  3 Sheets-Sheet 3
INVENTOR:-
Oscar F. Carlson
BY
ATTORNEYS Patented June 16, 1936

2,044,465

UNITED STATES PATENT OFFICE 2,044,465

PRESSURE AND DIFFERENTIAL CONTROL

Oscar F. Carlson, Chicago, Ill., assignor to Oscar F. Carlson Company, Chicago, Ill., a corporation of Illinois Application December 17, 1932, Serial No. 647,767

18 Claims. (Cl. 200—83)

The present invention relates generally to control mechanisms and is concerned particularly with pressure and differential control means especially adapted for use with boilers, furnaces and similar equipment. In boiler installations and the like for heating the interior of buildings it is frequently desirable to embody automatic control features for the purpose of keeping the temperature within the building to some approximately constant degree. One way of securing this result is the provision of pressure sensitive means responsive to steam pressures within the boiler and operative when the pressure falls too low to increase the fuel consumption, either by increasing the draft or the amount of fuel delivered to the burner, or by other well known expedients. Such pressure sensitive means is also responsive to an increase in steam pressure to reduce the draft or cut off or reduce the fuel consumption. In many cases the aforesaid control is effected through switch mechanisms of various kinds and associated apparatus, adapted to be cut in and cut out according to the variation of steam pressure within the boiler.

The amount of heat and rate of delivery thereof required to maintain a constant temperature in a room or other space to be heated is dependent upon the differences between the inside and outside temperatures. That is to say, the lower the outside temperature the greater will be the amount of heat and the length of time required to raise the temperature of the room or space, because the greater the difference between the inside and outside temperatures the greater will be the rate of dissipation of heat from the room. Also, the greater the rate of dissipation the greater will be the amount of heat required to maintain a constant temperature, for the amount of heat supplied must equal the amount lost.

It is, of course, practically impossible to adjust the apparatus to supply heat at just exactly the rate at which it is dissipated. Actually, in practice, the furnace or other source of heat is operated so as to raise the temperature of the room somewhat above the desired degree, then the fire will be cut off or reduced until the temperature falls somewhat below the desired degree, at which the fire will again be increased. This is done because it is undesirable to have the switch mechanisms and associated apparatus in constant operation, as would be the case if it were attempted to reduce the permissible variations to too great an extent. Therefore, the element of time is of importance for it is undesirable to have the fire increased and decreased at too frequent intervals; likewise, it is just as undesirable to raise the temperature of the space to be heated too far above to permit the temperature to fall too far below the desired degree or both, before reducing or increasing the fire. In the first case, while the temperature may be held practically exactly constant, the control apparatus is in practically constant operation, and in the second case the temperature of the room or other space to be heated varies over too great a range.

There is, therefore, a point where the control apparatus is not actuated too frequently nor are the permissible temperature variations excessive. But, as pointed out above, the rate of heat dissipation, which depends on the difference between inside and outside temperature, is a factor to be considered. For example, given a fixed temperature differential, that is, a fixed difference between minimum and maximum permissible temperature, the rate at which the temperature of the room would fall from the maximum to the minimum temperature is directly proportional to the difference between the inside and outside temperature. With a fixed differential, it therefore follows that if the outside temperature is low the control apparatus would be in practically constant operation because the furnace or boiler would not be maintained in operation for any great length of time nor would it be cut off for an appreciable length of time, whereas if the outside temperature were relatively high the furnace would be continued in operation for some length of time to raise the temperature to the fixed maximum and it would then be out of operation or reduced for a considerable period of time before the temperature fell to the fixed minimum. In the latter case, the length of time elapsing between operations of the control would be longer than necessary and the range of temperature variations would, likewise, be greater than necessary.

Hence, with a fixed permissible differential, the control apparatus would be operated too frequently at low outside temperatures and too seldom at relative high temperatures for best operation.

With these factors in mind, one of the principal objects of the present invention is the provision of pressure responsive means which is adjustable to accommodate various desired boiler pressures to develop the right amount of heat for either high or low temperature conditions, but which is, at the same time, operative to increase the permissible differential at low outside temperatures and to reduce it at high outside temperatures, thereby securing longer heating periods during low outside temperatures, to compensate for the high rate of dissipation, and longer non-operating periods during relative high outside temperatures, to compensate for the low rate of dissipation.

Another object of the present invention is the provision of means adapted to restrain the movements of a sensitive member responsive to a certain characteristic controlling factor, such as the steam pressure in a boiler, which is proportional to the available heat delivery, the degree of restraint being proportioned to another controlling factor, such as the difference between inside and outside temperatures.

Another object of the present invention is the provision of spring means arranged to resist the movement of the pressure responsive member, which spring means is capable of being adjusted to exert a greater or smaller resistance to movement of the pressure responsive member, in connection with auxiliary spring means, also adjustable, for loading the first mentioned spring means during the initial part of its movement in response to pressure variations, to delay its movement either to or from a given position or, preferably, both.

Another object of the present invention is to so arrange the adjusting means for the loading spring means that the same is automatically adjusted when the spring means for the pressure movable member is adjusted. Thus, when the pressure movable member is adjusted for higher pressures, to secure greater heating capacity for low outside temperatures, the loading spring means is also automatically adjusted to exert additional power to resist movement of the pressure movable member, thus securing greater differentials for low outside temperatures than for relative high outside temperatures.

Still further, another object of the present invention is to provide improved means for adjusting the spring means for the pressure responsive member, which adjusting means is particularly adapted to be set at the factory and which need not be subsequently disturbed.

Another object of the present invention is the provision of means for adjusting the auxiliary spring loading means, which adjusting means is arranged to be conveniently accessible and which is operative to control the rate at which the differential between minimum and maximum permissible temperatures varies.

A further object of the present invention is to provide a pressure and differential control which may be used in connection with feed water regulators, although it is to be understood that my invention is not to be limited to such installations but has the same if not greater utility with any form of heating plant.

These and other objects of the present invention will be apparent to those skilled in the art after a consideration of the following detailed description of the preferred structural embodiment, taken in conjunction with the accompanying drawings, in which:

Figure 1 is a side elevation of my improved control mechanism showing an exterior view of the casing and the adjusting lever by which the mechanism is set to be responsive to the desired pressure;

Figure 2 is an end view of the structure shown in Figure 1;

Figure 3 is a section taken along the line 3—3 of Figure 2;

Figure 4 is a section taken along the line 4—4 of Figure 3;

Figure 5 is a section taken along the line 5—5 of Figure 3 at the junction of the two casing parts and looking in the direction of the arrows in Figure 3;

Figure 6 is a section taken along the line 6—6 of Figure 5 and illustrating in detail the pivotal mounting for a part of the auxiliary loading spring means;

Figures 7 and 8 are enlarged details of one of the four similar terminals employed in the switch means shown in Figure 3; and Figure 9 is a circuit diagram illustrating the connections between the pressure switch and the liquid level switch.

In order to illustrate the present invention, the same has been described as embodied in a feed water regulator, but it is to be understood that my invention is equally applicable to boilers and the like not equipped with such apparatus.

Referring now to the drawings, the reference numeral 10 indicates, in its entirety, the casing of my improved control mechanism. The casing 10 comprises two parts, 11 and 12, secured together by cap screws 13 or the equivalent passing through openings in one of said parts and threaded into bosses 13' in the other casing part. The casing part 11 houses switch means 14, later to be described in detail, and the casing part 12 contains and serves as a mounting for the pressure responsive means and the auxiliary spring loading means therefor.

The casing part 11 is substantially rectangular in shape and is provided with a securing flange 16 having suitable apertures therein by which the casing as a whole may be secured to a feed water regulator 17 or the equivalent. The feed water regulator 17 is only fragmentarily illustrated in Figure 1, but it is sufficient to note that the same includes a casing 18 which is arranged to house the float or other liquid level responsive means, movement of the latter actuating, through suitable mechanism, an arm 19 which cooperates with the lever of a switch 20 to open and close a circuit in accordance with the level of water in the boiler. Since the particular details per se of the feed water regulator do not form any part of the present invention as such, the same has not been shown in detail. Various feed water regulators may be employed in this connection as, for example, the boiler feed control mechanism shown in my copending application, Serial No. 621,859, filed July 11, 1932, and entitled Boiler feed control.

Actually, of course, the above and subsequent references to feed water regulators are only for the purpose of illustrating only one out of the many contemplated uses of the present invention.

The casing 10 includes an apertured rigid wall 25 formed on the casing part 11 and a second apertured rigid wall 26 formed in the casing part 12. The rigid wall 25 is provided with an apertured boss 28 threaded to receive a bushing 30 through which passes an operating plunger rod 31 by which the pressure responsive means is made effective to operate one of the switches of the switch mechanism 14. Reference was made above to the switch lever 20 as being controlled in accordance with the float or other liquid level responsive means in the regulator casing 17, and the reference numeral 33 in Figure 3 refers to a similar switch which is arranged to be actuated by the plunger rod 31. The present invention is not particularly concerned with the details of either of these switches, as such, and therefore they have not been completely illustrated. It will suffice to note, however, as best shown in Figure 3, that each switch includes two pairs of contacts 35 and 36 and cooperating terminals 37 and 38 associated therewith, respectively. As will be clear from Figure 3, the contacts of each pair are arranged to be alternately opened and closed, since one contact of each pair is carried by the shiftable contact block 40. The cooperating contacts are carried by the terminals 37 and 38 which are, in turn, supported upon the terminal block 41. The contacts supported by the block 40 are carried thereon by brackets 43 and 44, as best shown in Figure 3.

Each of the terminals 37 and 38, as well as the terminals associated with the liquid level switch 20, are similar and, for purposes of illustration, the terminal 38 is shown in detail in Figures 7 and 8. From these figures it will be seen that the terminal comprises an angularly bent plate 48, one portion 49 of which is elongated and is provided with a pair of spaced lugs 50 between which is mounted a contact spring 51. The lower end of the spring 51 carries the contact point 52 which cooperates with the corresponding contact point 53 supported by the bracket 44. The upper end of the contact spring 51 is riveted to the terminal plate 48 while the contact point 52 is itself riveted to the spring 51. To accommodate the last named rivet the contact plate is apertured as at 55. The upper end 60 of the terminal plate is provided with a pair of lugs 61 and is apertured to receive a binding screw 62 which is threaded into a bushing 65 secured within the terminal block 41. If desired, the bushing 65 may be molded in the terminal block 41 during the process of manufacture thereof or the bushing may be secured therein by a pin or the equivalent. The block 41 is provided with a pair of slots 66 on opposite sides of a central web 67, and these slots are arranged to receive the elongated portions 49 of the terminal plates to prevent the same from turning. Tightening the binding screw 62 serves the double function of connecting the lead with the terminal plate and, at the same time, securing the terminal in position in the block 41.

The casing part 12 carries the majority of the pressure apparatus and from Figure 3 it will be noted that the edge of the casing part 12, opposite where it joins the casing part 11, is provided with a radially inturned flange 70 and is machined or otherwise formed with a flat surface to receive a plate 71 having a corrugation 72 therein and serving as the base of a sylphon bellows 73 secured thereto as by soldering, or the like. The sylphon 73 is provided with a head 74 having a cup-like depression 75 therein, and the flexible walls of the sylphon 73 and the movable head 75 together constitute a movable wall carried by the casing 10 and subjected to the pressure which serves as one of the controlling factors for the instrument. A sylphon cover member 76 embraces the bellows 73 and has a flanged periphery 78 provided with a plurality of apertures to receive securing cap screws 79. These cap screws pass through the flange 78 and the plate 71 and a washer 80 interposed therebetween, and serve to secure these parts to the flange 70 of the casing part 12. The sylphon cover 76 forms, in connection with the bellows 73, a pressure chamber 81, one side of which is closed by the movable wall structure consisting of the bellows 73 and the head 75. A pressure line 85 communicates through a fitting 86 with the interior of the pressure chamber 81. The pressure line 85 leads, preferably, to the steam space of the boiler An operating member 90 is secured at one end to the head 75, as by means of a screw 91, while the other end of the operating member 90 is slotted to provide a forked end 93 (Figure 5). The rigid wall 26 of the casing part 12 is provided with a threaded boss 94 in which is disposed a bushing member 95 which loosely receives the forked end 93 of the operating member 90. This end of the member 90 carries a pivot pin 96 and is pivotally connected with an operating lever 100 which is pivotally mounted, as at 101, on a pair of lugs 103 carried by or formed on the wall 26. The lower end of the operating lever 100 is provided with a lateral extension 105 (Figure 5) which is adapted to engage the plunger or push rod 31 whereby movements of the movable wall 73—75 are communicated through the operating member 90 and the lever 100 to the push rod 31, whereby the switch is actuated.

For the purpose of reinforcing the bellows 83 and preventing the collapse thereof under pressures existing within the pressure chamber 81, spring means 110 is provided and reacts against the rigid wall 26 and engages with the cup-like depression 75 for resisting movement of the head 74 under the pressures existing within the pressure chamber 81. The pressure spring 110 bears at its inner end against a washer 111, as best shown in Figure 3, and this washer serves as a ball race to receive the anti-friction balls 112 interposed between the washer 111 and an adjusting sleeve or plate 114 concentrically disposed with respect to the aperture in the rigid wall 26 and the operating push-rod 90. The sleeve member 114 embraces a pressure adjusting cam 115 which is provided with a plurality of two or more circumferentially inclined cam portions 116, preferably serrated. The adjusting cam plate 115 is provided with one or more pairs of apertures 118 to receive pins 119 carried by the boss 94 on the wall 26 for the purpose of locating the cam plate and preventing the same from rotating. The pressure adjusting sleeve member 114 is provided with a plurality of radially inwardly extending projections 120, which are rounded and which engage the serrations on the circumferentially inclined cam portions of the cam plate 115. Preferably, there are as many projections 120 as there are cam portions on the cam plate 115. The adjusting sleeve 114 carries a handle 125 which extends outwardly of the casing part 12 through a slot 126 therein for the purpose of providing means accessible from without the casing for actuating the adjusting sleeve 114.

As is apparent, the handle 125 may be utilized to rotate the sleeve member 114 with respect to the cam plate 115 and the spring means 110, and relative rotation between the sleeve 114 and the plate 115 causes the projections 120 of the former to ride up on the inclined cam surfaces, thereby occasioning an axial movement of the sleeve 114 with respect to the plate 115 and the casing 12. This axial movement is effective to increase or decrease the tension on the spring 110, thereby adjusting the mechanism for high or low pressures. The serrations on the cam surfaces serve the purpose of retaining these parts in any adjusted position. Obviously, the greater the tension to which the spring 110 has been adjusted, the greater will be the pressure which can exist within the pressure chamber 81 before the flexible wall structure 73—75 will be shifted to operate the switch mechanism.

The threaded bushing 95 has its outer end slotted, as best shown in Figure 3, to accommodate the operating lever 100. The cam plate 115, while restrained from rotation by the pins 119 in the boss 94, bears against the inner end of bushing 95. As a factory setting for adjusting the tension of spring 110 the bushing 95 may be screwed in or out before the lever 100 is assembled.

For reasons pointed out above, when outside temperatures are relatively high it is desirable to have the control means responsive to small differentials. Assume, for example that the desired constant temperature is 70° F. When outside temperatures are high it may be desirable to have the control means shut off the fire when the temperature reached 72° F. and to start up the fire at 68° F., thus providing a differential of 4°. However, if outside temperatures were low, a differential of 4° would mean that the control would be in practically constant operation because of the rapidity at which the temperature could change as much as 4°, due to low outside temperatures. Hence, at low outside temperature a greater differential becomes very desirable.

In the illustrated embodiment, the control is set for supplying sufficient heat during low outside temperatures by adjusting the spring means 110 so as to provide for higher steam pressures before the switch or switches will be operated. This adjustment is secured, as pointed out above, by swinging the handle 125 to increase the tension of the spring 110. That is to say, when operating with relatively low pressures in the pressure chamber 81, as during periods of relatively high outside temperatures, the spring means 110 is not tensioned to a great extent, but during periods of relatively low outside temperatures, the tension of the spring 110 will be increased to provide for relatively high pressures within the chamber 81.

Now, in order to provide for an automatic increase in the permissive differential whenever the tension of the spring means is increased to provide for low outside temperatures, the present invention contemplates the provision of means for loading the spring means 110 with an additional resistance to either delay the shutting off of the fire or the starting of the fire or both, to a greater or less extent, in accordance with the adjustment of the spring 110. For example, instead of a differential of 4°, as suggested above, a differential of 10° may be provided for low outside temperatures, in which case the fire would be continued until, say, 78° had been reached, and the fire would then be discontinued until the temperature of, say, 68° had been reached. If the outside temperature is low it may be possible that this fall of 10° would occur in about the same time as a fall of 4°, the differential mentioned above, during a period of relatively high outside temperature. Of course, it would also be possible to provide, instead of the 78°–68° variation, a variation of 75°–65°. In any event, the present invention contemplates imposing upon the movements of the sylphon an additional resistance the magnitude of which is automatically determined and adjusted by the setting of the spring 110, whereby only small differentials are available when outside temperatures are high and relatively larger differentials are available when outside temperatures are low. Hence, it becomes apparent that the tension of the auxiliary loading means should be decreased whenever the tension of the main spring means 110 is decreased, and vice versa. The present invention contemplates adjusting both of these spring means simultaneously, as mentioned above.

The auxiliary loading means includes a differential lever 130 of channel formation and having a pair of lateral flanges apertured to receive a pivot pin 131, carried by the casing part 12. At one end the flanges are discontinued and a small pin 132 inserted in the lever 130 to provide an anchoring means for the two springs 134 and 135. The opposite end of the differential lever 130 receives a roller 136 therebetween, the roller being mounted upon a pin 137. This roller cooperates with the upper end of the operating lever 100, which end is provided with a cam projection 140 providing a pair of oppositely disposed cam inclines. This end of the operating lever 100 is arranged to pass at least partially between the flanges of the differential lever 130. The upper end of the operating lever 100 is also provided with a stop or hook 142 which cooperates with one end of the differential lever 130 to limit the movement of the operating lever with respect to the differential lever. For this purpose the roller end of the differential lever 130 is provided with a slot 143 to receive the stop 142.

The spring 135 serves as a force-storing means for securing the auxiliary loading impressed, as mentioned above, upon the spring means 110. The upper spring 134 has its lower end encircling the pin 132 in the differential lever 130 and has its upper end received within a bushing 145 which, in turn, bears against an adjusting screw 146 threaded into an upwardly extending boss 147 formed on the casing part 12. The adjusting screw 146 is held in adjusted position by means of a cotter key 148. The lower spring 135 has its upper end encircling the pin 132 and is received at its lower end within a bushing 151 similar to bushing 145 and slidably disposed within a lower extension of the boss 147. The spring 134 is arranged in opposition to the auxiliary loading spring 135 and serves as a manual adjusting means therefor, accessible from without the casing and additional to the automatic adjustment effected by adjusting the pressure spring 110 as will be apparent. The spring 135, acting against the spring 134, tends to move the differential lever 130 and its roller end against the upper end of the operating lever 100, and, in addition to the spring 134 and the manual adjusting screw 146, the effectiveness of the loading spring 135 can be varied by shifting the lower bushing 151. Preferably, as mentioned above, this adjustment is secured simultaneously with the adjustment of the spring 110, and for this purpose the adjusting sleeve 114 is provided with a circumferentially inclined cam flange 155 which bears against the bushing 151. These parts are so arranged that when the adjusting sleeve 114 is rotated to cause the projections 120 thereof to ride up on the cam surfaces 116 to increase the tension of the spring 110, the cam member 155 is rotated to shift the bushing 151 upwardly, thereby increasing the tension exerted by the lower spring 135 and therefore causing the roller 136 to bear with an increased force against the upper end of the operating lever 100.

The cam projection 140, with its oppositely disposed inclined faces is so arranged that when the movable wall 75 first begins to move under an increasing pressure within the chamber 81, the swinging of the operating lever 100 in a clockwise direction as viewed in Figure 3, brings the upwardly inclined cam face against the roller 136 which tends to cam the roller upwardly. This is resisted, however, by the tension of the spring 135. Obviously, therefore, if the spring 110 is adjusted to considerable tension so, likewise, will the spring 135 be adjusted to an increased tension. This makes it necessary for pressure to be developed within the chamber 81 which is equal to the accumulated resistances offered by the springs 110 and 135, minus the effect of the upper spring 134. As soon as this pressure has been attained, however, the movable wall 75 forces the operating member 99 toward the left against the effective resistance of the springs 134 and 135, thereby swinging the operating lever 100 and actuating the various switch means associated with the plunger pin 31, the roller 136 passing over the crest of the cam 140. As soon, however, as the roller reaches the top of the cam projection 140 and then begins to roll down the opposite or downwardly inclined face, the effect of the spring 135, which first aided the spring 110 in resisting movement of the movable wall 75, now assists the movable wall in moving against the tension of the spring 110. This change-over immediately overbalances the forces on opposite sides of the movable wall by an amount which is equal to twice the effect of the combined springs 134 and 135. At this point, therefore, the preponderance of pressure is in favor of swinging the operating lever in the direction of its movement and this causes a quick action of the switch mechanism 33.

As mentioned above, when the spring means 110 is adjusted for only low pressures, then it would be unnecessary to have the spring means 135 adjusted to exert much tension, and in this case the movement of the adjusting sleeve 114 to a position corresponding to reduced tension in the spring 110 also causes a reduced tension in the springs 134 and 135. Conversely, when the sleeve member 114 is rotated to increase the tension in the spring 110 the tension in the lower spring 135 is also increased.

As the room temperature falls, the pressure in the pressure chamber 81 is likewise reduced, which causes the spring 110 to urge the movable wall 75 toward the right in Figure 3. This movement, however, cannot be completed until the lever 100 is swung back to the position shown in Figure 3, and this cannot be done until the reduced pressure is such that the spring 110 has enough force to raise the roller 136 against the action of the spring 135. Thus, as illustrated, the cam means 140 and associated parts are such that a double action is secured, namely, the permissible maximum and minimum temperatures are both varied to secure an increased differential for low outside temperatures.

It is, of course, not necessary to have the cam means 140 double acting. If desired, the cam means may be provided with only one inclined section, in which case the movement of the operator 90 would be resisted in only one direction. For example, as suggested above, this is the situation when the maximum temperature is shifted from 74° to 78°, leaving the minimum temperature 68° for both high and low outside temperatures. Likewise, the control may be automatically adjusted by changing only the minimum permissible temperature.

For the purpose of permitting ready assembly of the differential lever 120 and associated parts, the face of the casing part 12 which joins with the casing part 11 is provided with a kerf or groove 160 to receive the pin 131. The casing part 12 is also formed with a pair of bores 161 and 162 normal to the plane of the face of the casing 12, and these two bores are adapted to receive cylindrical blocks 164 and 165, so dimensioned as to lie flush with the face of the casing part 12 when the pin 131 is in place, so that when the two casing parts are secured together the pin 131 is also fixed in position.

Figure 9 illustrates one of the many possible hook-ups which may be employed with the arrangement shown. In Figure 9 the terminals 37 and 38 are indicated and the other pair of terminals for the switch 20 are indicated by the reference numerals 37' and 38'. Two of the conductors leading to the terminals are connected with a source of current, while the conductors from the other two terminals lead to an alarm circuit or an operating circuit, or both. In Figure 9 the alarm circuit is indicated by a bell A, and the operating circuit is indicated by a relay B. Preferably, the signal and alarm circuits are energized whenever either the float switch or the pressure switch is closed, or both. Other arrangements are possible, as, for example, arranging the operating circuit to cut off the fire when the pressure increases beyond a predetermined minimum and to sound a signal when the pressure becomes too low. Likewise, the circuits may be so arranged that when the water level falls too low the fire is cut off and when it becomes too high an alarm is sounded. Obviously, there are other arrangements possible, but the present invention is not primarily concerned with these arrangements per se.

While I have described above the preferred structural embodiment, it will be apparent to those skilled in the art that my invention is not to be limited to the specific details shown and described, but that, in fact, widely different means may be employed in the practice of the broader aspects of my invention.

What I claim, therefore, and desire to secure by Letters Patent is:

1. Control apparatus comprising an adjustable member movable in response to variations in value of a controlling factor between minimum and maximum limits thereof, and means for automatically restricting and widening said limits in response to adjustment of said member to accommodate changes in conditions affecting said controlling factor.

2. Control mechanism comprising, in combination, a switch, a member movable in response to variations in one of the factors effecting the control for actuating said switch, adjustable yielding means for resisting said movement, supplemental means associated with said member and operative to also resist movement thereof, and means uniformly movable proportionally to the adjustment of said yielding means for varying the resistance of said supplemental means.

3. Control mechanism comprising, in combination, means movable in response to variations in a factor effecting the control, means adjustable over a given range for variably resisting said movement, supplemental means arranged to also resist said movement and acting to delay said movement by its additional resistance, and means interconnected with said first adjustable means for adjusting said supplemental means so that the latter can exert an effective power proportional to the power of said adjustable means.

4. Control mechanism comprising, in combination, means movable in response to variations in one of the factors effecting the control, adjustable spring means resisting said movement, supplemental spring means also resisting said movement, and means for simultaneously adjusting both of said spring means to vary the effect thereof.

5. Control mechanism comprising, in combination, a casing having a chamber provided with a movable wall, a circular cam plate carried by said casing, a rotatable sleeve embracing said cam plate and having abutment portions contacting with the cam portions of said plate, spring means biased between said sleeve and said movable wall, and means for rotating said sleeve relative to said cam plate for adjusting the tension of said spring means.

6. Control mechanism comprising, in combination, a casing having a chamber provided with a movable wall, a circular cam plate having peripheral cam portions carried by said casing, a rotatable sleeve embracing said cam plate and having abutment portions engageable with said cam portions, spring means biased between said sleeve and said movable wall, bearing means between said spring means and said sleeve providing for rotation of the latter relative to the spring means and said plate, means for rotating said sleeve relative to said cam plate for adjusting the tension of said spring means, said casing, cam plate and sleeve having coaxially disposed openings, and an actuating member extending through said openings.

7. Control mechanism comprising, in combination, a casing having an apertured wall and a movable wall, means subjecting said movable wall to variations in pressure, an operating member connected with said movable wall and extending through the aperture in said apertured wall, a circular cam plate carried by said apertured wall and having cam portions concentrically disposed with respect to the aperture therein, a rotatable plate encircling said member and bearing against said circular cam elements, spring means biased between said rotatable plate and said movable wall, and means for rotating said rotatable plate to adjust the tension of said spring means.

8. Control mechanism comprising, in combination, a casing having an apertured rigid wall and a movable wall, means forming in connection with said movable wall a pressure chamber, a cam plate secured to said rigid wall in concentric relation with respect to the aperture therein, an operating member projecting to said aperture and connected with said movable wall, a rotatable plate having a cylindrical portion embracing the cam portions of said cam plate and provided with projections cooperating therewith, spring means biased between said rotatable plate and said movable wall, means for rotating said rotatable plate with respect to said cam portions to adjust the tension in said spring means, a lever pivotally connected with said operating member and a lever fulcrumed on said rigid wall and connected at one end to move with said operating member, and means associated with the other end of said lever and controlled in accordance to the position of said rotatable plate for modifying the action of said spring means in response to variations of pressure within said pressure chamber.

9. Control mechanism comprising, in combination, a casing having an apertured wall and a movable wall, means forming in connection with the movable wall a pressure chamber, cam means concentrically disposed with respect to the aperture in said rigid wall, spring means biased between the cam means and the movable wall, an operating member connected at one end with said movable wall and having its other end extending through said cam means and the aperture in said rigid wall, a lever connected at one end with said operating member and fulcrumed on said rigid wall, auxiliary spring means biased against the other end of said lever and operative to resist movement thereof, and means carried by said cam means for adjusting the tension of said auxiliary spring means in accordance with the tension to which said biased spring means has been adjusted by said cam means.

10. Control mechanism comprising, in combination, a casing having an apertured rigid wall and a movable wall, an operating member connected with said movable wall and extending through the aperture in said rigid wall, adjustable spring means resisting movement of said movable wall, a lever fulcrumed on said rigid wall and connected at one end with said operating member, the opposite end of said lever having a cam projection, spring means bearing against said latter end of the lever and cooperating with said cam projection to resist movement of the lever, and means for adjusting said spring means in accordance with the adjustment of said first mentioned adjustable spring means.

11. Control apparatus comprising, in combination, a casing having a rigid apertured wall and a movable wall, means forming in connection with the movable wall a pressure chamber, said wall being movable in response to variations of pressure within said chamber, a lever fulcrumed on said rigid wall and connected at one end with said movable wall, the other end of said lever being provided with a cam projection, adjustable spring means resisting movement of said movable wall in one direction, a second lever pivotally mounted on said rigid wall and having at one end a roller adapted to be engaged by one side of said cam projection when said pivoted lever is actuated by movement of said movable wall in said one direction against the tension of said spring means, auxiliary spring means cooperating with said second lever and serving in connection therewith to resist movement of said first lever until the same has been moved sufficiently to bring the other side of said cam projection into engagement with said roller, means for adjusting the tension of said first mentioned spring means, and means for adjusting said auxiliary spring means when said first mentioned spring means is adjusted.

12. Control mechanism comprising, in combination, a casing having a pair of rigid walls and a movable wall, said rigid walls having apertures therein, means connected with said casing exteriorly of the movable wall and forming in connection therewith a pressure chamber, variations of pressure therein being impressed upon said movable wall, a cam plate secured to one of said rigid walls surrounding the aperture therein and provided with circumferentially inclined cam portions, a sleeve member embracing said cam plate and having projections cooperating with said cam portions, spring means biased between said sleeve and said movable wall, means accessible from without the casing for rotating said sleeve to adjust the position of said spring means, an operating member connected at one end with said movable wall and extending through said sleeve and cam plate and through the opening in said one rigid wall, a lever connected at one end with said operating member and fulcrumed upon said rigid wall, the other end of said lever being formed with a cam projection having oppositely disposed cam inclines, a second lever pivotally mounted in said casing and having at one end a roller adapted to engage said cam projection, a pair of oppositely disposed spring means carried by said casing and cooperating with the other end of said second lever to give the same a bias to urge the roller thereof against the cam end of said fulcrumed lever, and a cam member carried by said sleeve and operative when the latter is rotated to adjust the tension of said first mentioned spring means to adjust the bias exerted upon said second lever, said second spring means operating to resist movement of said pivoted lever during the initial movement thereof and of said interconnected movable wall until said lever has been moved to bring the roller on the opposite cam incline.

13. Control mechanism comprising, in combination, a separable two part casing, one part provided with a rigid apertured wall, the second part of said casing also having a rigid apertured wall and a movable wall, means carried by the casing and forming in connection with said movable wall the pressure chamber, means connected with said movable wall and extending to the aperture in said second rigid wall into the space between said two rigid walls, a lever disposed in said space and fulcrumed on the second of said rigid walls, a stationary cam plate carried by said second rigid wall and concentrically disposed with respect to the aperture therein, a rotatable sleeve embracing said cam plate and rotatable about said member as an axis, a ball race carried by said sleeve, spring means biased between said movable wall and said sleeve, said spring means having at its end adjacent said sleeve a ball race with antifriction means disposed between said ball races to provide for relative rotation between said sleeve and said spring means, circumferentially inclined cam portions formed on said cam plate and provided with a plurality of serrations thereon, projections carried by said sleeve and cooperating with said serrated cam portions, said sleeve being rotatable to adjust the tension in said spring means, a second lever carried by said second rigid wall, means pivotally mounting said second lever thereon, said means being removable when said casing parts are separated, a lever carried by said second rigid wall and having one end connected with said operating member and formed with a cam projection at the opposite end thereof, means carried by said second lever for co-operation with the opposite portions of said cam projection, spring means biasing said second lever for movement against the end of said first lever having the cam projection, a cam formed adjacent the circumference of said sleeve and cooperating with said second spring means for adjusting the tension thereof to cause said second lever to bear against the first lever with a force proportional to the adjusted tension of said first mentioned spring means, a plunger rod disposed within the aperture in said first mentioned rigid wall, and means carried by said first lever for actuating said plunger rod.

14. In a thermo-responsive switch, means for raising and lowering the temperature at which the switch is opened and closed and means for varying the temperature differential between temperatures of closing and opening of the switch as the opening and closing temperatures are progressively raised and lowered by the first named means.

15. In a thermo-responsive switch, means for varying the temperatures of closing and opening the switch and means for varying the temperature of closing the switch at a greater rate than the temperature of opening the switch is varied and a member for operating the said means simultaneously.

16. In a thermo-responsive switch, means for varying the temperature of operation of the switch and means operated by the first named means for increasing the temperature differential between the closing and opening of the switch as the temperature of closing of the switch is raised and decreasing the temperature differential as the temperature of closing the switch is decreased.

17. In a thermo-responsive switch, an expansible pressure device for operating the switch, a spring for resisting the expansion of the pressure device and means for adjusting the spring resistance and means for increasing the differential of the spring pressures between the switch closing and opening pressures of the pressure device upon increase of resistance of the spring to the operation of the pressure device by the first named means.

18. In a thermo-responsive switch, means for adjusting the temperatures at which the switch is opened and closed and operative to produce a substantially constant differential between the temperatures of opening and closing the switch, means for modifying the first named means for progressively varying the differential produced by the first named means to increase the differential when the temperature is raised to a relatively high point and to decrease the differential when the temperature is lowered to a relatively low point.

OSCAR F. CARLSON.